(12) United States Patent
Rofougaran

(10) Patent No.: US 8,086,182 B2
(45) Date of Patent: Dec. 27, 2011

(54) PROGRAMMABLE ANTENNA WITH PROGRAMMABLE IMPEDANCE MATCHING AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 339 days.

(21) Appl. No.: 12/468,282

(22) Filed: May 19, 2009

(65) Prior Publication Data

US 2010/0297962 A1 Nov. 25, 2010

(51) Int. Cl.
*H04B 1/00* (2006.01)
(52) U.S. Cl. ...................................... 455/63.4
(58) Field of Classification Search .................. None
See application file for complete search history.

(56) References Cited

U.S. PATENT DOCUMENTS

| 7,378,851 B1 * | 5/2008 | de Rooij et al. ............... 324/322 |
| 2004/0266343 A1 * | 12/2004 | Fenk et al. .................... 455/12.1 |
| 2007/0250139 A1 * | 10/2007 | Kanzius ........................ 607/100 |

* cited by examiner

*Primary Examiner* — Lincoln Donovan
*Assistant Examiner* — Sibin Chen
(74) *Attorney, Agent, or Firm* — Garlick, Harrison & Markison; Bruce E. Stuckman

(57) ABSTRACT

A wireless transceiver includes a programmable antenna, that is configurable to a selected one of a plurality of antenna configurations, based on a control signal. An antenna interface is coupled to the programmable antenna. An RF transceiver section can include at least one power amplifier having a output section that includes a first plurality of tunable inductors that impedance match the output section to the antenna interface. The RF transceiver section can further include at least one low noise amplifier having an input section that includes a first plurality of tunable inductors that impedance match the input section to the antenna interface.

14 Claims, 14 Drawing Sheets

Configuration sequence 70: [Antenna configuration 1 | Antenna configuration 2 | Antenna configuration 3 | ... | Antenna configuration N]

FIG. 6

Configuration sequence 70: [Antenna configuration 1 | Antenna configuration 2 | Antenna configuration 3 | ... | Antenna configuration N]

Proper subset 74: [Antenna configuration 2 | ... ]

Configuration sequence 72: [Antenna configuration N+1 | Antenna configuration N+2 | Antenna configuration N+3 | ... | Antenna configuration N+P]

FIG. 7

| Data table 90 | | |
|---|---|---|
| Antenna configuration | Selected? | Control Signal |
| 001 | no | CS001 |
| 002 | no | CS002 |
| 003 | yes | CS003 |
| 004 | no | CS004 |

US 8,086,182 B2

PROGRAMMABLE ANTENNA WITH PROGRAMMABLE IMPEDANCE MATCHING AND METHODS FOR USE THEREWITH

CROSS REFERENCE TO RELATED PATENTS

The present application is related to the following U.S. patent applications:

PROGRAMMABLE ANTENNA WITH CONFIGURATION CONTROL AND METHODS FOR USE THEREWITH, having Ser. No. 12/468,231, filed on May 19, 2009;

MULTI-MODE PROGRAMMABLE ANTENNA WITH CONFIGURATION CONTROL AND METHODS FOR USE THEREWITH, having Ser. No. 12/468,245, filed on May 19, 2009;

the contents of which are incorporated herein by reference thereto.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication and more particularly to antennas used to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the V-band of 55-64 GHz.

Different radio networks sometimes share the same spectrum. For example, Bluetooth transceivers and 802.11 g transceivers may both be present in a single area using the 2.4 GHz band. In the V-band, devices using Wireless HD (WiHD) and devices using the Next Generation Microwave System (NGMS) may be present in a single area. Transmissions by one device can cause interference with other devices that use the same frequency band with the same area.

Other disadvantages of conventional approaches will be evident to one skilled in the art when presented the disclosure that follows.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 6 is a schematic block diagram of a configuration sequence in accordance with an embodiment of the present invention;

FIG. 7 is a schematic block diagram of a configuration sequence in accordance another embodiment of the present invention;

DETAILED DESCRIPTION OF THE INVENTION

Figure 1:
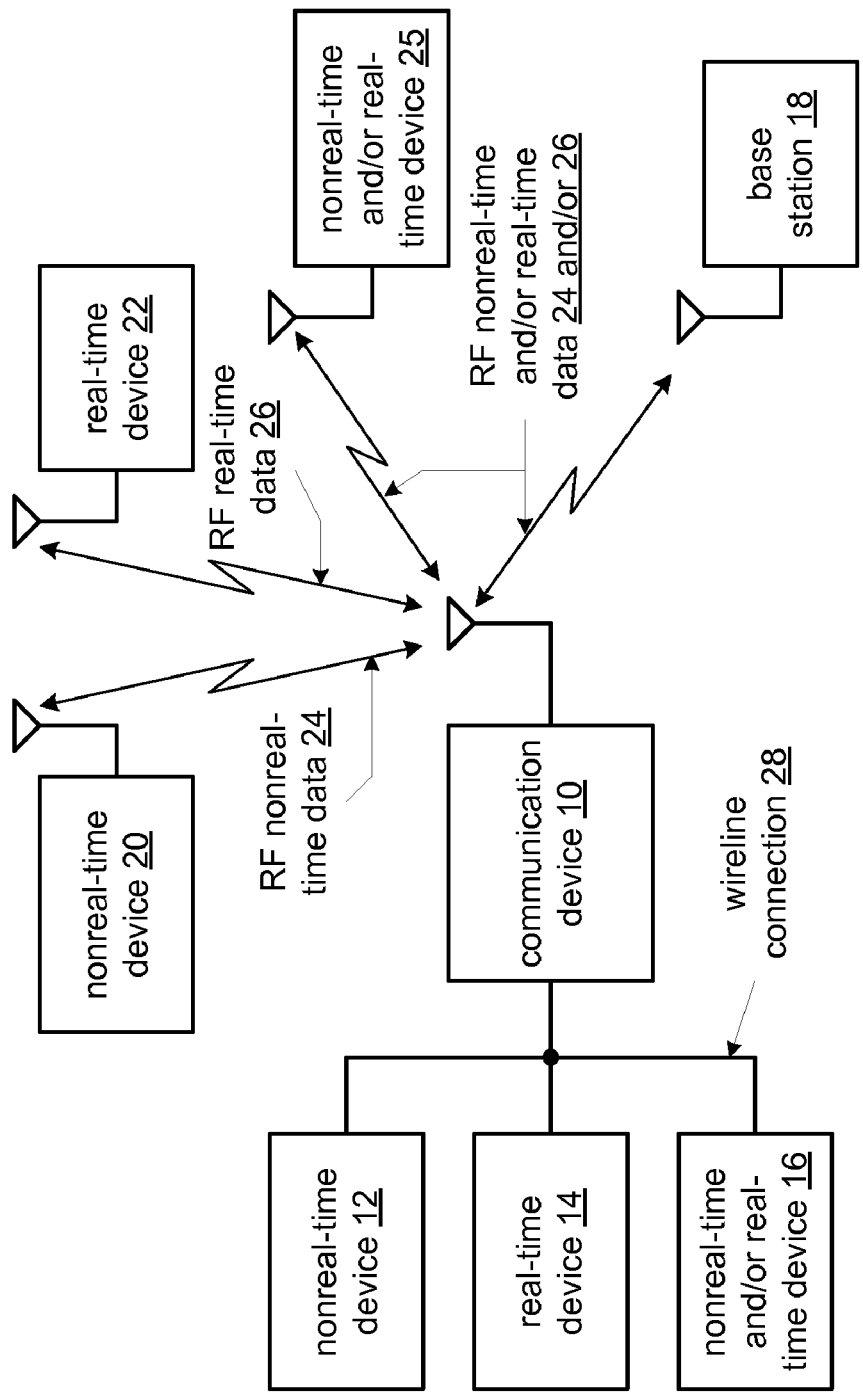
FIG. 1 is a schematic block diagram of an embodiment of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a wireless transceiver and/or programmable antenna that includes one or more features or functions of the present invention. Such devices shall be described in greater detail in association with FIGS. 3-23 that follow.

Figure 2:
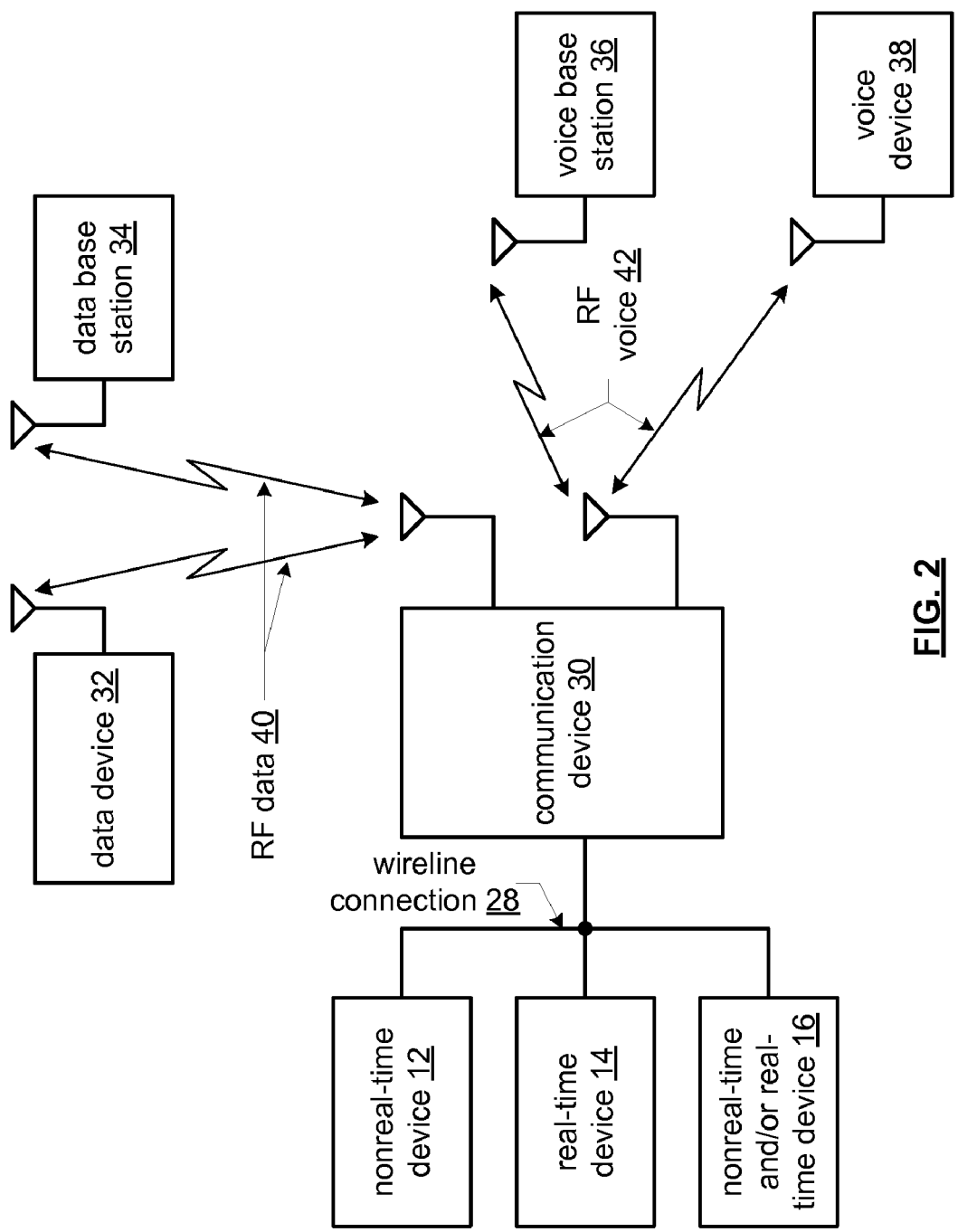
FIG. 2 is a schematic block diagram of another embodiment of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
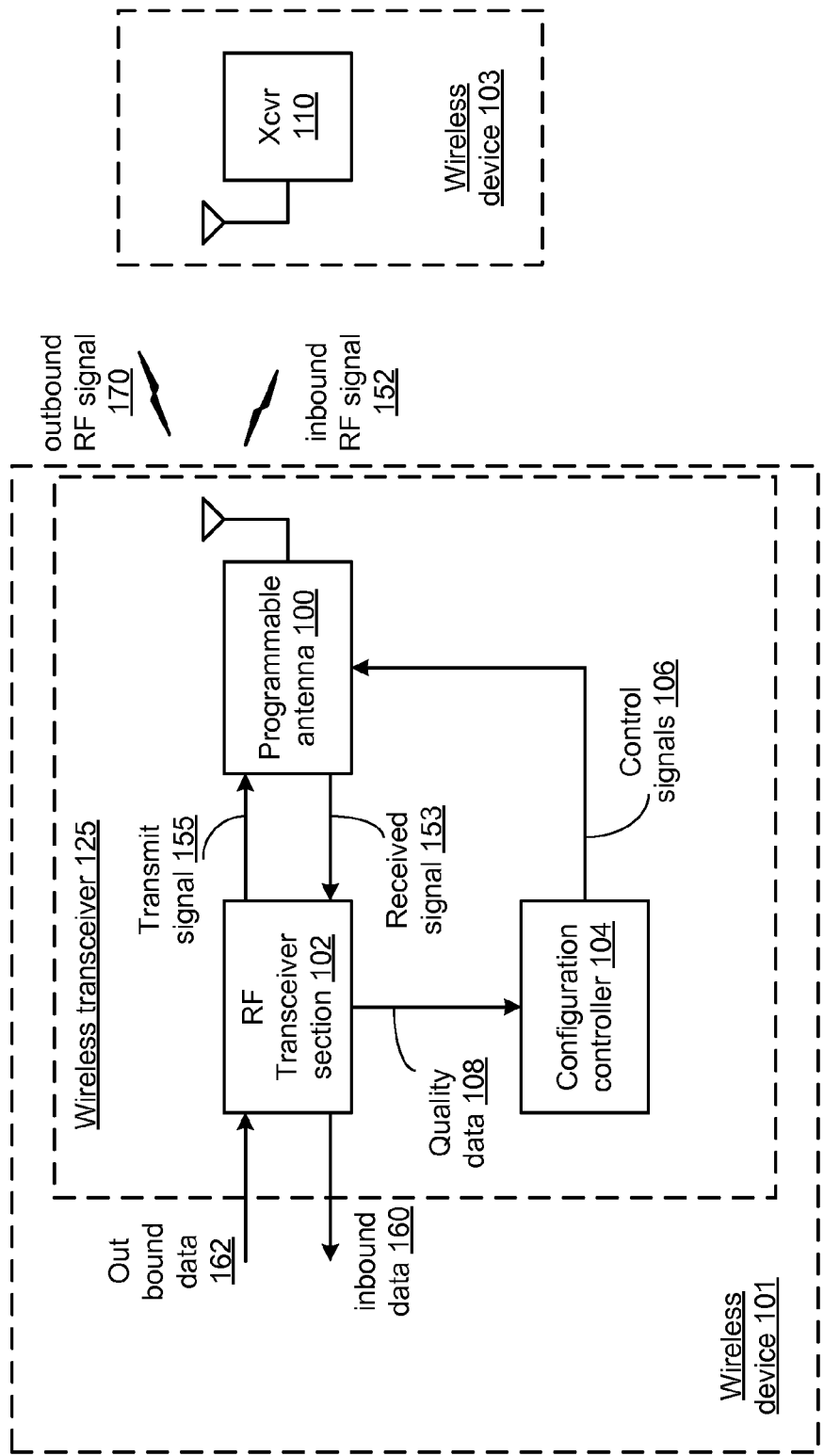
FIG. 3 is a schematic block diagram of an embodiment of a wireless transceiver 125 in accordance with the present invention.

FIG. 3 is a schematic block diagram of an embodiment of a wireless transceiver 125 in accordance with the present invention. In particular, a wireless transceiver 125 is shown that is included in a wireless device 101, such as communication device 10 or 30 or other wireless device. Wireless transceiver includes programmable antenna 100 that transmits an outbound RF signal 170 containing outbound data 162 to one or more remote transceivers such as wireless device 103 having a complementary transceiver 110. In addition, programmable antenna 100 receives an inbound RF signal 152 containing inbound data 160 from the wireless device 103. The programmable antenna 100 is configurable based on control signals 106 to a plurality of different antenna configurations, such as different gains, frequencies, polarizations and radiation patterns.

In an embodiment of the present invention, the programmable antenna 100 includes multiple individual antenna elements. Examples of such individual antenna elements include monopole or dipole antennas, three-dimensional in-air helix antenna, aperture antennas of a rectangular shape, horn shaped, etc.; dipole antennas having a conical shape, a cylinder shape, an elliptical shape, etc.; and reflector antennas having a plane reflector, a corner reflector, or a parabolic reflector; meandering pattern or a micro strip configuration. Further, programmable antenna 100 can be implemented with one or more antenna arrays and further includes a control matrix that controls the phase and amplitude of the signals to and from each individual antenna element in order to adjust the radiation pattern of the array based on an antenna weight vector. The programmable antenna 100 can be tuned for operation in the V-band of 55-64 GHz or other millimeter wave frequency band or other portion of the RF spectrum such as a 900 MHz band, 2.4 GHz band, 5 GHz band or other frequency band.

The antenna configuration controller 104 generates the control signals 106 to configure the programmable antenna 100 via a configuration procedure. The RF transceiver section 102 generates a transmit signal 155 based on the outbound data 162 that is transmitted as outbound RF signal 170. In addition, the RF transceiver section 102 generates the inbound data 160 from a received signal 153 generated by programmable antenna 100 in response to the inbound RF signal 152. The programmable antenna 100 can include a multiple antennas of different of different designs, different frequencies, different polarizations, or a single array, separate arrays of antennas for transmission and reception and/or separate arrays that are physically separated.

Configuration controller 104 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the configuration controller 104 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, the configuration controller 104 contains a table of control signals 106 that correspond to a plurality of candidate antenna configurations. In operation, a particular antenna configuration is generated for the programmable antenna 100 by the configuration controller 104 generating the corresponding control signals 106, and the programmable antenna 100 implementing the selected configuration in response thereto. In an embodiment of the present invention, the control signals 106 include a particular value of the antenna weight vector that is used by an antenna array included in the programmable antenna 100 to adjust the antenna configuration to a desired radiation pattern including a beam pattern, polarization, etc. Alternatively, the control signals 106 can include any other signal that indicates the desired antenna configuration, such as by selecting a particular antenna, beam pattern, frequency, polarization, etc.

As will be discussed further in conjunction with figures that follow, configuration controller 104 operates based on quality data 108 from RF transceiver section 102. In particular, quality data 108 can be generated based on the transmission or reception characteristics between the wireless transceiver 125 and one or more remote transceivers such as transceiver 110. The quality data 108 can include a signal strength, a signal to noise ratio, a signal to noise and interference ratio, a bit error rate, a packet error rate, a retransmission rate, and/or mode interference data generated based on the interference between different RF transceivers in use contemporaneously by the communication device 30 or other data that indicates the performance of a particular antenna configuration in facilitating the communication between one or more remote transceivers 110. Candidate radiation patterns can be selected or eliminated by comparing the quality data to a quality threshold. In this fashion, radiation patterns for programmable antenna 100 that correspond to good communication paths can be identified and selected.

In an embodiment of the present invention, the configuration controller 104 implements the configuration procedure as part of a pairing procedure between the wireless transceiver 125 and one or more remote transceivers 110. In this fashion, the communication between these devices can be initialized. In addition, the configuration controller 104 can update the antenna configurations from time to time. In particular, the configuration controller 104 can periodically test alternative antenna configurations or initiate a test of alternative antenna configuration during communication quiet times. In circumstances when the device characteristics of the wireless device 101 or mobility data received from wireless device 103 indicates that one or more of the devices are mobile, configuration controller can schedule periodic updates at a frequency that is based on the motion of such a device or the relative motion between devices.

Configuration controller 104 can continually monitor the quality data 108 for a selected radiation pattern and aggregates the quality data 108 based on a windowing approach, an exponentially weighted moving average, a low pass filter or other smoothing technique. If the aggregated quality data degrades beyond the quality threshold for that radiation pattern, the configuration controller 104 can initiate an update procedure to update the antenna configuration.

Figure 4:
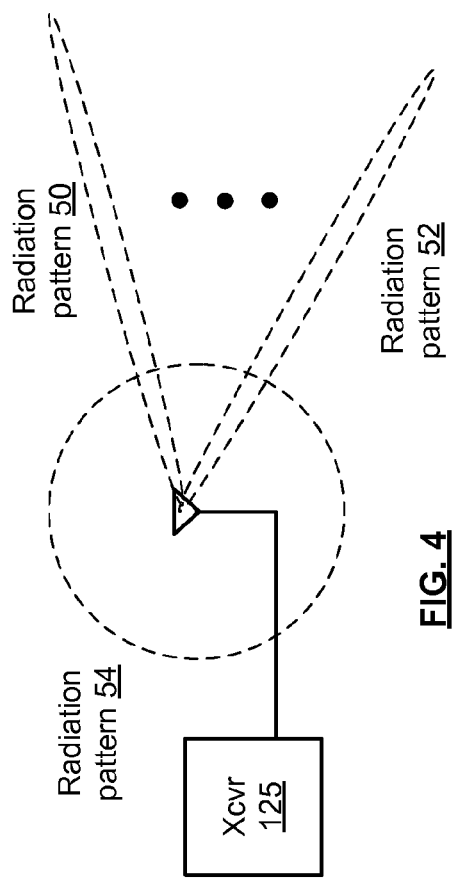
FIG. 4 is a schematic block diagram of various radiation patterns produced by different antenna configurations of wireless transceiver 125 in accordance with an embodiment of the present invention.

FIG. 4 is a schematic block diagram of various radiation patterns produced by wireless transceiver 125 in accordance with an embodiment of the present invention. In this example, the programmable antenna 100 can include 30-40 individual antenna elements and can produce steerable beam having a beamwidth of 1 to 3 degrees, as well as wider beam patterns including an omnidirectional radiation pattern. Radiation patterns 50, 52 and 54 correspond to there different antenna configurations of the programmable antenna 100 of wireless transceiver 125. Radiation patterns 50 and 52 present examples of two narrow beam radiation patterns, while radiation pattern 54 represents a substantially omnidirectional pattern. While these radiation patterns are presented in two dimensions, it should be recognized that the radiation patterns 50 and 52 are representative of possible radiation patterns in any direction in three dimensional space. Radiation pattern 54 can be a three-dimensional omnidirectional pattern or a pattern that is omnidirectional or substantially omnidirectional about one or more axes. As discussed in conjunction with FIG. 3, in addition to controlling the particular beam pattern, the radiation pattern corresponding to a particular antenna configuration can also be controlled to a particular polarization, such as a horizontal polarization, a vertical polarization, a right circular polarization and a left circular polarization, etc.

Figure 5:
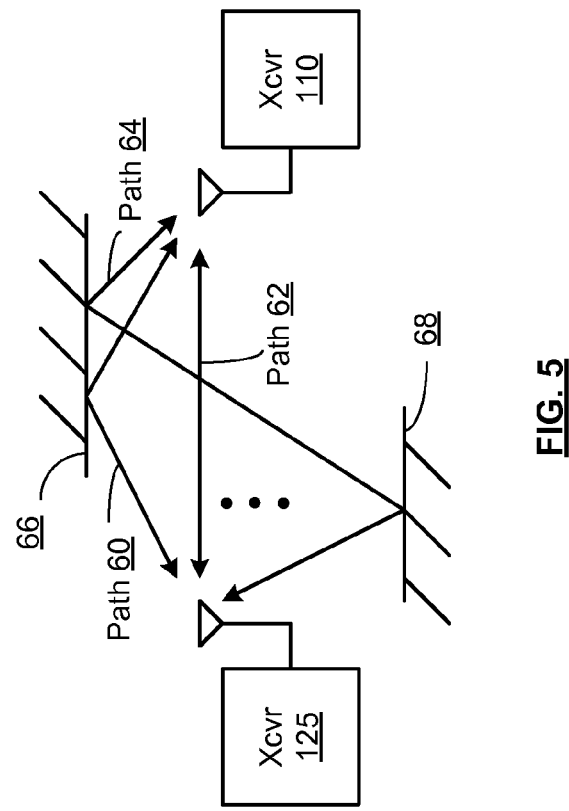
FIG. 5 is a schematic block diagram of various communication paths produced by wireless transceiver 125 in accordance with an embodiment of the present invention.

FIG. 5 is a schematic block diagram of various communication paths produced by wireless transceiver 125 in accordance with an embodiment of the present invention. In particular, paths 60, 62 and 64 represent three communication paths that can be supported by the programmable antenna 100 based on the antenna configuration that is selected. In this particular case, transceiver 110 is implemented in a similar fashion to transceiver 125 and also includes a phased array antenna, such as programmable antenna 100.

For example, in a first antenna configuration transceivers 125 and 110 steer their antenna beams to produce communication path 60 that includes a reflection off of object 66, such as a ceiling, wall, floor, article of furniture or other object. In a second antenna configuration, transceivers 125 and 110 steer their antenna beams to produce a line of sight path 62. In a third antenna configuration, transceivers 125 and 110 steer their antenna beams to produce communication path 64 that includes a reflection off of objects 66 and 68.

While these communications paths are presented in two dimensions, it should be recognized that the paths 60, 62 and 64 are representative of possible communication paths in any direction in three dimensional space.

FIG. 6 is a schematic block diagram of a configuration sequence in accordance with an embodiment of the present invention. In particular, a configuration sequence 70 is shown as part of a configuration procedure for a programmable antenna, such as programmable antenna 100. In this example, the configuration sequence 70 includes N different candidate antenna configurations that are generated to promote the identification of a selected antenna configuration. In an embodiment of the present invention, the N candidate antenna configurations can encompass a range of different antennas, different beam patterns, different polarizations, etc.

In operation, the programmable antenna evaluates the N candidate antenna configurations, based on quality data, such as quality data 108, collected for each antenna configuration where:

$$N>1$$

The quality data 108 for each of the N candidate antenna configurations is evaluated to determine if the quality data corresponding to any of the antenna configurations compares favorably to a quality threshold. If one of the N candidate antenna configurations is identified as generating quality data 108 that exceeds the quality threshold, that candidate antenna configuration can be selected. If more than one of the N candidate antenna configurations is identified as generating quality data 108 that exceeds the quality threshold, the quality data 108 for the identified candidate antenna configurations can be compared and the antenna configuration with the overall best performance can be selected.

If however, if none of the quality data 108 corresponding the antenna configurations compares favorably to the quality threshold, the configuration procedure generates a new set of candidate antenna configurations as presented in conjunction with FIG. 7.

FIG. 7 is a schematic block diagram of a configuration sequence in accordance with an embodiment of the present invention. In particular, a configuration sequence 72 is shown as part of a configuration procedure for a programmable antenna, such as programmable antenna 100, where none of the quality data 108 corresponding the previous N antenna configurations compares favorably to the quality threshold. In this case, a proper subset 74 of the N candidate antenna configurations is generated that includes antenna configuration 2 and optionally other antenna configurations. In particular the proper subset 74 is generated based on identifying the best performing M candidate antenna configurations from the N candidate antenna configurations, where:

$$M \geq 1; \text{ and}$$

$$M<N$$

The configuration procedure continues by a new group of P candidate antenna configurations of configuration sequence 72, based on the proper subset 74, where:

$$P>1$$

The configuration procedure continues in an iterative fashion to evaluate the candidate antenna configurations of configuration sequence 72, based on the quality data 108 corresponding to each candidate antenna configuration. Again, a selected antenna configuration is identified when the quality data corresponding to one or more antenna configuration compares favorably to the quality threshold. Further, if however, if none of the quality data 108 corresponding the P antenna configurations compares favorably to the quality threshold, the configuration procedure generates a proper subset of the P antenna configurations and generates a new set of candidate antenna configurations based on the proper subset of the P antenna configurations. In particular, the configuration can continue iteratively until an acceptable antenna configuration is identified, or when all of the antenna configurations have been exhausted, based on a selection the best of all previous antenna configurations, after a comparison of quality data 108 for all previous antenna configurations.

The operation of the configuration procedure can be explained in conjunction with the examples presented below and in conjunction with FIG. 8-9. In one example, the N candidate antenna configurations utilize a plurality of different antenna polarizations and the proper subset 74 is generated by identifying, based on the candidate antenna configurations having the most favorable quality data 108, the candidate antenna configuration or configurations with the best polarization or polarizations.

The configuration procedure continues by generating P new candidate antenna configurations having different beam patterns, in accordance with the best polarization or polarizations identified from the first proper subset. A selected antenna configuration is identified when the quality data corresponding to one or more antenna configuration compares favorably to the quality threshold. Further, if however, if none of the quality data 108 corresponding the P antenna configurations compares favorably to the quality threshold, the configuration procedure proceeds iteratively by generating a proper subset of the P antenna configurations, based on, for instance, a refinement of the best beam pattern or patterns and further by generates a new set of candidate antenna configurations, etc.

Figure 8:
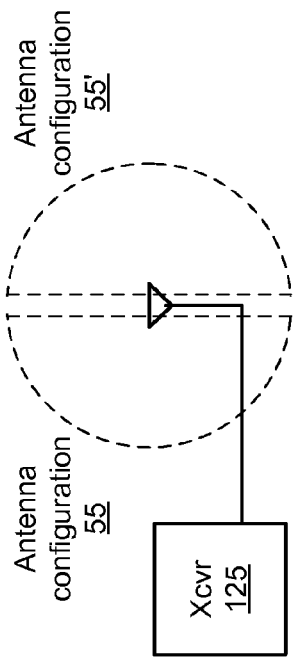
FIG. 8 is a schematic block diagram of various radiation patterns produced by different antenna configurations of wireless transceiver 125 in accordance another embodiment of the present invention.

FIG. 8 is a schematic block diagram of various radiation patterns produced by different antenna configurations of wireless transceiver 125 in accordance another embodiment of the present invention. In particular, beam patterns are shown corresponding to antenna configurations 55 and 55' that are used to illustrate the operation of further configuration procedures.

In one example, once a polarization has been identified in a first iteration of the configuration procedure based on the evaluation of antenna configurations with different polarizations, a configuration sequence is generated to evaluate the antenna configurations 55 and 55'. While shown in two dimensions, the antenna configurations 55 and 55' represent a subdivision of a spherical radiation pattern into two opposing hemispherical beams. In this procedure, the candidate antenna configurations 55 and 55' are evaluated, based on the quality data 108 corresponding to each candidate antenna configuration. A selected antenna configuration is identified when the quality data corresponding to either antenna configuration 55 or antenna configuration 55' compares favorably to the quality threshold. Further, if however, if none of the quality data 108 corresponding the candidate antenna configurations 55 and 55' compares favorably to the quality threshold, the configuration procedure generates a proper subset, based on which of the two candidate antenna configurations 55 and 55' generates the best quality data. The configuration procedure can then continue by generating a new set of candidate antenna configurations based on the particular candidate antenna configuration 55 or 55' identified as the best.

Figure 9:
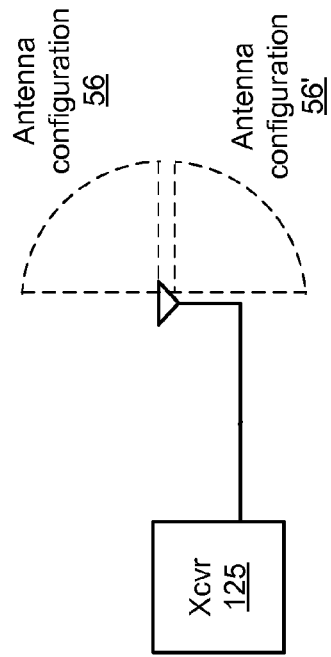
FIG. 9 is a schematic block diagram of various radiation patterns produced by different antenna configurations of wireless transceiver 125 in accordance another embodiment of the present invention.

FIG. 9 is a schematic block diagram of various radiation patterns produced by different antenna configurations of wireless transceiver 125 in accordance another embodiment of the present invention. In particular, the example configuration procedure begun in FIG. 8 is continued. In this example, the antenna configuration 55' was identified as the best of the antenna configurations 55 and 55' in the prior iteration of the configuration procedure. However, neither of the antenna configurations 55 and 55' was selected, because neither of the antenna configurations 55 and 55' generated quality data 108 that exceeded the quality threshold. In this case, a new group of antenna configurations 56 and 56' are generated and evaluated in a new configuration sequence. In particular, while shown in two dimensions, the antenna configurations 56 and 56' represent the subdivision of the hemispherical radiation pattern of antenna configuration 55' into two narrower beam patterns.

In this procedure, the candidate antenna configurations 56 and 56' are evaluated, based on the quality data 108 corresponding to each candidate antenna configuration. A selected antenna configuration is identified when the quality data corresponding to either antenna configuration 56 or antenna configuration 56' compares favorably to the quality threshold. Further, if however, if none of the quality data 108 corresponding the candidate antenna configurations 56 and 56' compares favorably to the quality threshold, the configuration procedure generates a proper subset, based on which of the two candidate antenna configurations 56 and 56' generates the best quality data. The configuration procedure can then continue by generating a new set of candidate antenna configurations based on the particular candidate antenna configuration 56 or 56' identified as the best, and for instance, to subdivide the best beam pattern into narrower beams with greater gain.

In this fashion, the configuration procedure can home in on a sufficiently narrow beam pattern for the programmable antenna 100 without the need of testing all possible narrow beam patterns. While in the example described above, a polarization is been identified in a first iteration of the configuration procedure, polarization can be determined at another iteration or evaluated at each iteration, based on the generation of each new set of candidate antenna configurations at each iteration.

Further, while the example presented in conjunction with FIGS. 8 and 9 evaluate two candidate antenna configurations at each iteration, a greater number of candidate antenna configurations can be evaluated, for instance, by starting with four configurations and subdividing the best configuration into four narrower patterns, etc. or by generating antenna configurations with combinations of different beam patterns, different spatial diversity, different polarizations, etc. Also, while the example described in conjunction with FIGS. 8 and 9 generates an improper subset as the single best antenna configuration, two or more antenna configurations can be included in the improper subset, particularly when the values of N and P are greater than two.

Figure 10:
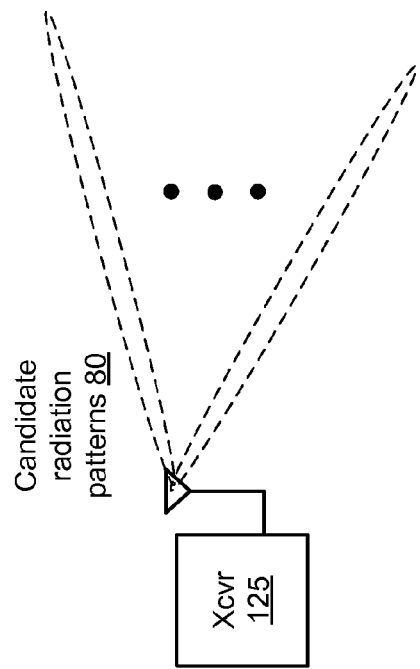
FIG. 10 is a schematic block diagram of a wireless transceiver 125 and wireless transceiver 110 during a pairing procedure in accordance with an embodiment of the present invention.

FIG. 10 is a schematic block diagram of a wireless transceiver 125 and wireless transceiver 110 during a pairing procedure in accordance with an embodiment of the present invention. In particular, a pairing procedure is presented that uses one or more of the configuration procedures previously described in conjunction with FIGS. 3-9. In order to initialize the antenna configuration used between two wireless transceivers, such as wireless transceivers 110 and 125, the particular set of radiation patterns to be used by each device and the association between each of the radiation patterns needs to be determined. In particular, a collaborative pairing procedure is employed to determine selected radiation patterns for each device in such a fashion that a radiation pattern for one device is associated with a reciprocal radiation pattern for the other device. Coordination of the various activities of the pairing procedure between the configuration controllers 104 of the two devices communicating via control signaling effectuated via omnidirectional antenna configurations for one or both devices.

The pairing procedure includes a procedure that configures the radiation patterns for the wireless transceiver 125. In this portion of the pairing procedure, the configuration controller 104 of transceiver 110 generates controls signals 106 to establish an omnidirectional or substantially omnidirectional radiation pattern 82. The configuration controller 104 of wireless transceiver 125 generates control signals 106 to run a configuration procedure to select an antenna configuration having corresponding radiation pattern of the plurality of candidate radiation patterns 80. In operation, the configuration controller 104 selects an antenna configuration when an acceptable communication path to transceiver 110 exists along the axis of that candidate radiation pattern.

While the candidate radiation patterns 80 are presented in two dimensions, it should be recognized that the candidate radiation patterns 80 are representative of possible radiation patterns in any direction in three dimensional space.

Figures 11, 12:
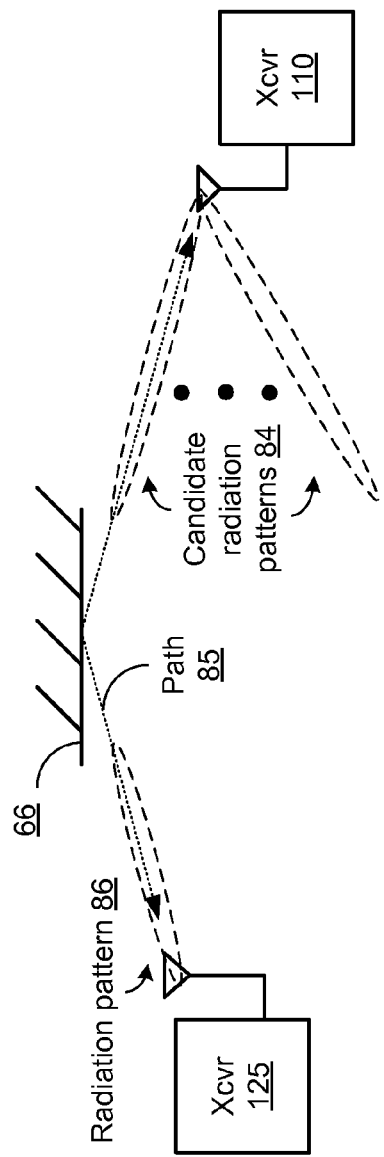
FIG. 11 is a further schematic block diagram of a wireless transceiver 125 and wireless transceiver 110 during a pairing procedure in accordance with an embodiment of the present invention.
FIG. 12 is a schematic block diagram of an embodiment of a data table in accordance with the present invention.

FIG. 11 is a further schematic block diagram of a wireless transceiver 125 and wireless transceiver 110 during a pairing procedure in accordance with an embodiment of the present invention. After transceiver 125 has selected an antenna configuration with corresponding radiation pattern 86 and path 85, the configuration controller 104 of wireless transceiver 110 generates control signals 106 to run the configuration procedure to iteratively test each of a plurality of antenna configurations having a corresponding plurality of candidate radiation patterns 84. The configuration controller 104 generates quality data based on quality signals 108 for each of the candidate radiation patterns 84 and the configuration procedure runs iteratively to select an antenna configuration corresponding to path 85.

While the candidate radiation patterns 84 and radiation pattern 86 and path 85 are presented in two dimensions, it should be recognized that the candidate radiation patterns 84, radiation pattern 86 and path 85 are representative of possible radiation patterns and paths in any direction in three dimensional space. It should also be noted that while various functions in the pairing procedure performed by wireless transceiver 125 and 110 can be reversed in other embodiments.

FIG. 12 is a schematic block diagram of an embodiment of a data table in accordance with the present invention. In particular a data table 90 is shown for use in conjunction with a configuration controller, such as configuration controller 104. In particular, control signal data CS001, CS002, CS003, CS004 are stored in association with corresponding antenna configurations 001, 002, 003, 004, etc. The data table 90 can store data corresponding to all possible antenna configuration. To implement a particular antenna configuration, such as configuration 002, the configuration controller 104 can lookup the corresponding control signal data, in this case CS002, to generate the control signals 106. As shown, once a particular antenna configuration has been selected, the data table 90 includes an indicator of which antenna configuration was selected. While not shown, each antenna configuration can include relationship data linking it to other related antenna configurations in terms of like polarizations, subdivision of antenna beam patterns and the like in linked list structure, a hierarchical structure or other data structure in order to facilitate the selection of new candidate antenna configurations based on the improper subsets generated in the prior iteration.

Figure 13:
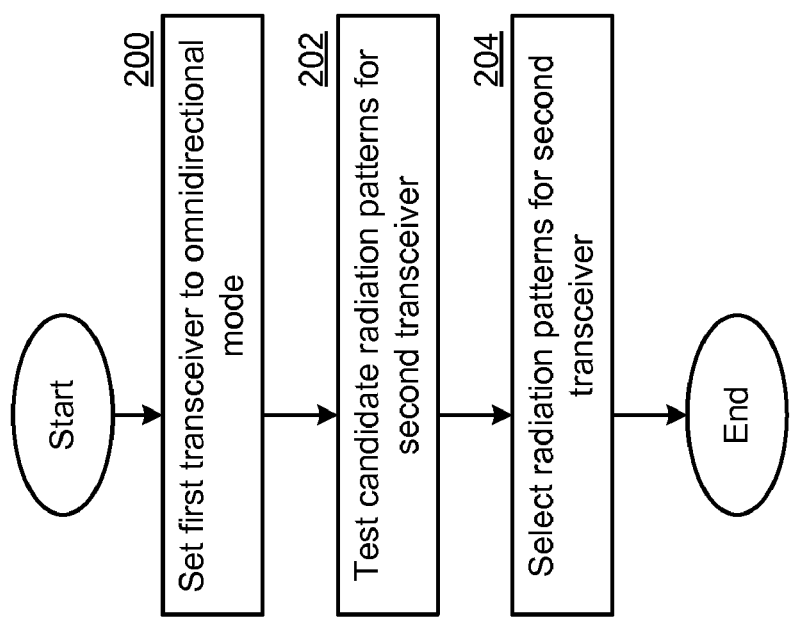
FIG. 13 is a flowchart representation of an embodiment of a method in accordance with the present invention.

FIG. 13 is a flowchart representation of an embodiment of a method in accordance with the present invention. In particular, a portion of a collaborative pairing procedure between a first and second transceiver is shown. In step 200, a first transceiver is set to an omnidirectional mode. In step 202, candidate radiation patterns are tested for the second transceiver. In step 204, radiation patterns are selected for the second transceiver, based on the test results.

Figure 14:
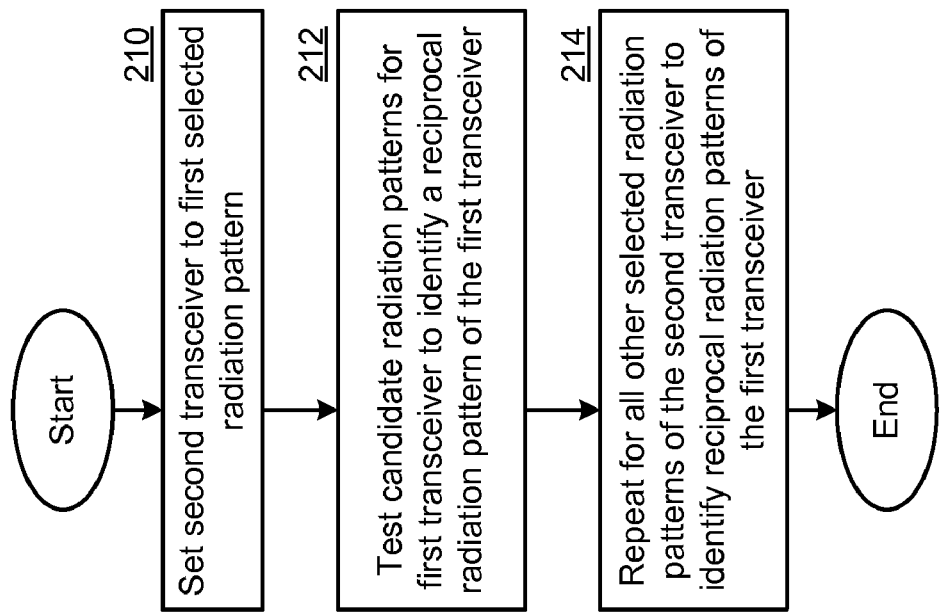
FIG. 14 is a flowchart representation of an embodiment of a method in accordance with the present invention.

FIG. 14 is a flowchart representation of an embodiment of a method in accordance with the present invention. In particular a method is presented for use in association with the method presented in conjunction with FIG. 13. In particular, after the method of FIG. 13 is performed, the second transceiver is set to a first selected radiation pattern, as shown in step 210. In step 212, the candidate radiation patterns for the first transceiver are tested to identify a reciprocal radiation pattern for the first transceiver. In step 214, the process is repeated for all other selected radiation patterns of the second transceiver to identify corresponding reciprocal radiation patterns of the first transceiver.

Figure 15:
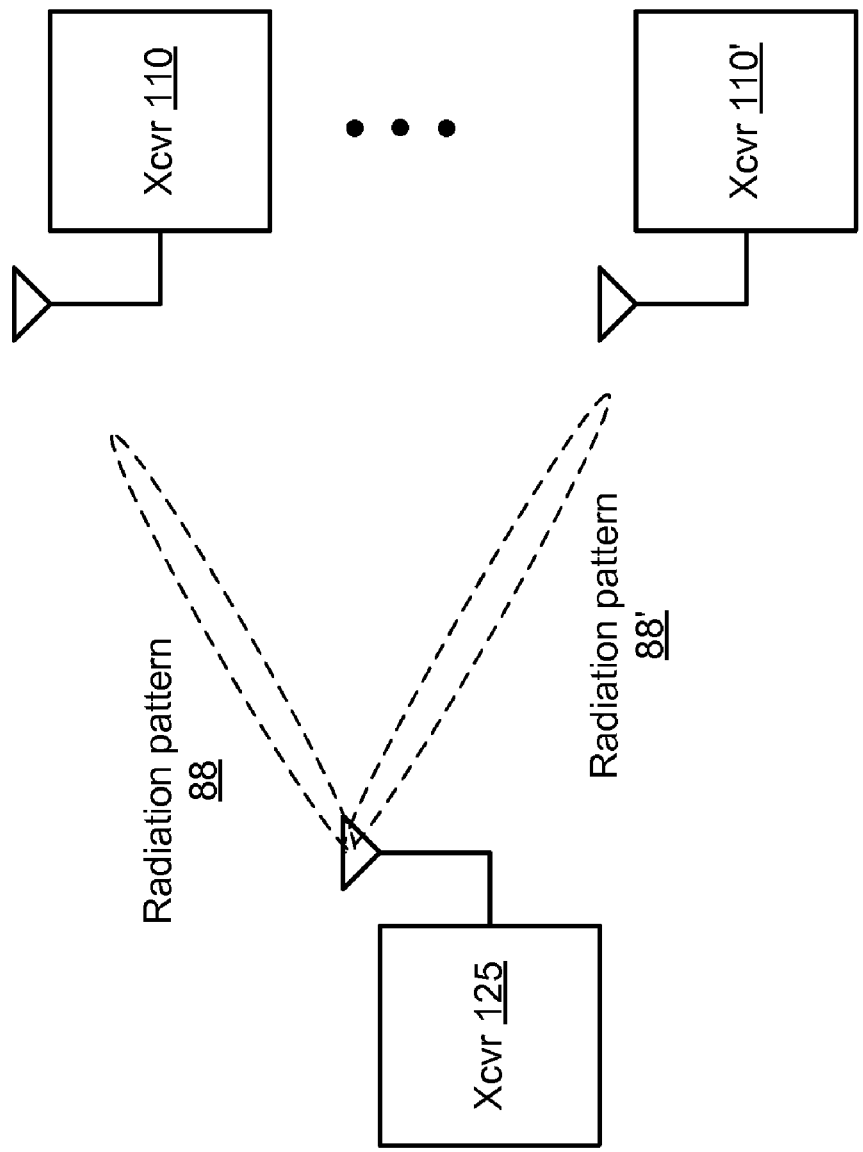
FIG. 15 is a schematic block diagram of various radiation patterns produced by an antenna configuration of wireless transceiver 125 in accordance another embodiment of the present invention.

FIG. 15 is a schematic block diagram of various radiation patterns produced by an antenna configuration of wireless transceiver 125 in accordance another embodiment of the present invention. In particular, a wireless transceiver 125 is presented in an implementation such as communication device 30 where communication can occur contemporaneously with a plurality of devices via transceivers 110 . . . 110'. In particular, Wireless transceiver 125 includes a first RF transceiver section that generates a first outbound RF signal in accordance with a first communication protocol based on the first outbound data and that generates the first inbound data based on a first inbound RF signal in accordance with a first communication protocol. A second RF transceiver section of wireless transceiver 125 generates a second outbound RF signal in accordance with a second communication protocol based on the second outbound data and that generates second inbound data based on a second inbound RF signal in accordance with the second communication protocol.

In this embodiment, the programmable antenna 100 can be a multi-mode antenna that transmits the first outbound radio frequency (RF) signal to a remote transceiver 110 and that receives a first inbound RF signal from the remote RF transceiver 110. Further, the programmable antenna 100 contemporaneously transmits a second outbound RF signal to a second remote transceiver 110' and that receives a second inbound RF signal from the second remote RF transceiver 110'.

As previously described, the configuration controller 104 operates to generate control signals 106 to establish an antenna configuration and, in particular executes a configuration procedure to select a particular antenna configuration. However, each antenna configuration contains two or more individual antenna configurations corresponding to each mode of communication and/or each separate remote transceiver in communication with the wireless transceiver 125. For instance, each of antenna configurations can utilize a plurality of antenna polarizations including a first antenna polarization for use in conjunction with the first communication protocol and a second antenna polarization for use in conjunction with the second communication protocol.

In operation, the configuration procedure can make decisions based on quality data that indicates the performance of each of the individual antenna configurations. In this embodiment however, the quality data further includes mode interference data that indicates the amount of interference between the different communication modes. The configuration procedure can operate iteratively to evaluate antenna configurations for one mode of operation at a time. In this fashion, the antenna configuration for a first mode of communication via a first protocol with a first device can be selected as previously described. Then the configuration procedure can proceed to evaluate antenna configurations for the communication via a second protocol with a second device, with each candidate antenna configuration using the selected antenna configuration for the first mode. In the alternative, the configuration procedure can, at each iteration, vary the individual antenna configurations of both modes of communication.

Figure 16:
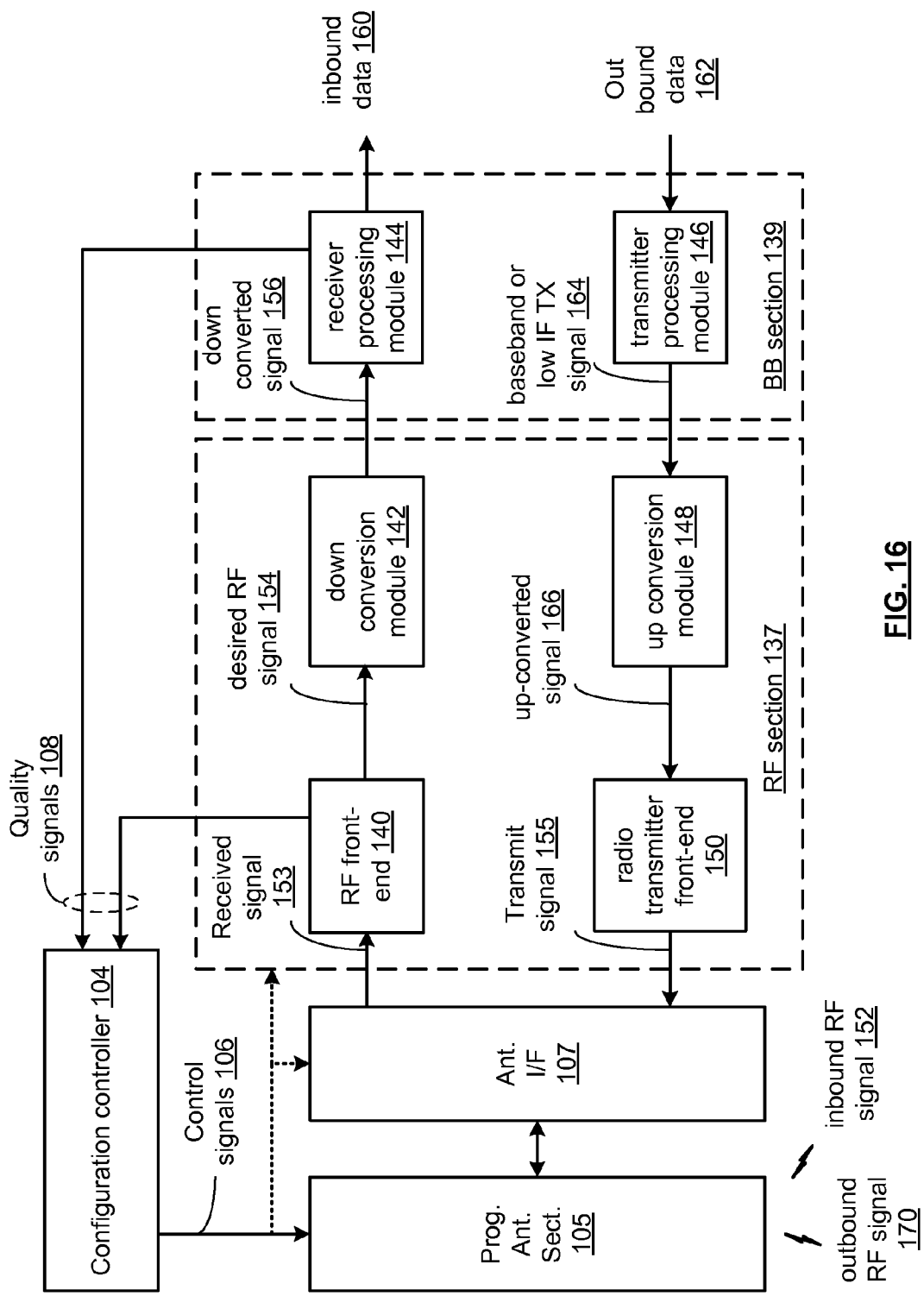
FIG. 16 is a schematic block diagram of an embodiment of RF section 137 and baseband section 139 in accordance with the present invention.

FIG. 16 is a schematic block diagram of an embodiment of RF section 137 and baseband section 139 in accordance with the present invention. In particular an RF section 137 and baseband section 139 are shown that implement an RF transceiver section such as RF transceiver section 102. The RF section 137 includes an RF front end 140, a down conversion module 142, radio transmitted front end 150 and up conversion module 148. The baseband section 139 includes a receiver processing module 144 and transmitter processing module 146.

As shown, radio transmitter front end 150 couples the transmit signal 155 to the programmable antenna 100 (implemented via a programmable antenna section 105 and configuration controller 104), via the antenna interface 107 to produce outbound RF signal 170. RF front end 140 receives received signal 153 generated by programmable antenna 100 based on inbound RF signal 152 as coupled by the antenna interface 107. The antenna interface 107 includes a transmit/receive switch, diplexor, balun or other isolation circuitry along with optional impedance matching.

In operation, the transmitter processing module 146 processes the outbound data 162 in accordance with a particular wireless communication standard (e.g., WiHD, NGMS, IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation.

The radio transmitter front end 150 includes at least one power amplifier and may also include a transmit filter module. The power amplifier amplifies the up converted signals 166 to produce outbound RF signals 170, which may be filtered by the transmitter filter module, if included.

The receiver front-end 140 includes a low noise amplifier with optional filtration that produces a desired RF signal 154 in response to received signal 153. The RF front end 140 further includes a signal level detector or other circuit that generates a quality signal 108 that indicates a received signal strength, signal to noise ratio, signal to noise and interference ratio, mode interface measurement or other receiver quality indication.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication protocol (e.g., WiHD, NGMS, IEEE 802.11, Bluetooth, RFID, GSM, CDMA, et cetera) to produce inbound data 160. The processing performed by the receiver processing module 144 can include, but is not limited to, digital intermediate frequency to baseband conversion, demodulation, demapping, depuncturing, decoding, and/or descrambling. Receiver processing module 144 further generates quality signal 108 based on a bit error rate, a packet error rate, a retransmission rate or other receiver quality indication that is based on either the reception of data from a remote station or that is analyzed by a remote transceiver and included in data received from that remote station. In one example, the receiver processing module 144 can generate quality data based on its own observations of bit error rate, a packet error rate, a retransmission rate, etc. In a further example, the receiver processing module 144 can receive control data from a remote transceiver that includes that remote transceivers observations of bit error rate, a packet error rate, a retransmission rate, signal strength, signal to noise ratio, signal to noise and interference ratio, or other quality metrics.

Note that the receiver processing module 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

As previously discussed, configuration controller generates control signals 106 to select different antenna configurations of programmable antenna section 105. In an embodiment of the present invention, the antenna interface 107 includes a tunable impedance, such as a tunable inductor and/or tunable capacitor to tune the antenna interface to the particular antenna configuration. In addition, as will be discussed further in conjunction with FIGS. 18-22, the RF section 137, and in particular the RF front-end 140 and radio transmitter front-end 150 optionally include tunable impedances such as tunable capacitors or inductors that impedance match the input and output sections of the RF section 137 to the antenna interface 107 and programmable antenna section 105, based on the antenna configuration indicated by the control signals 106.

Figure 17:
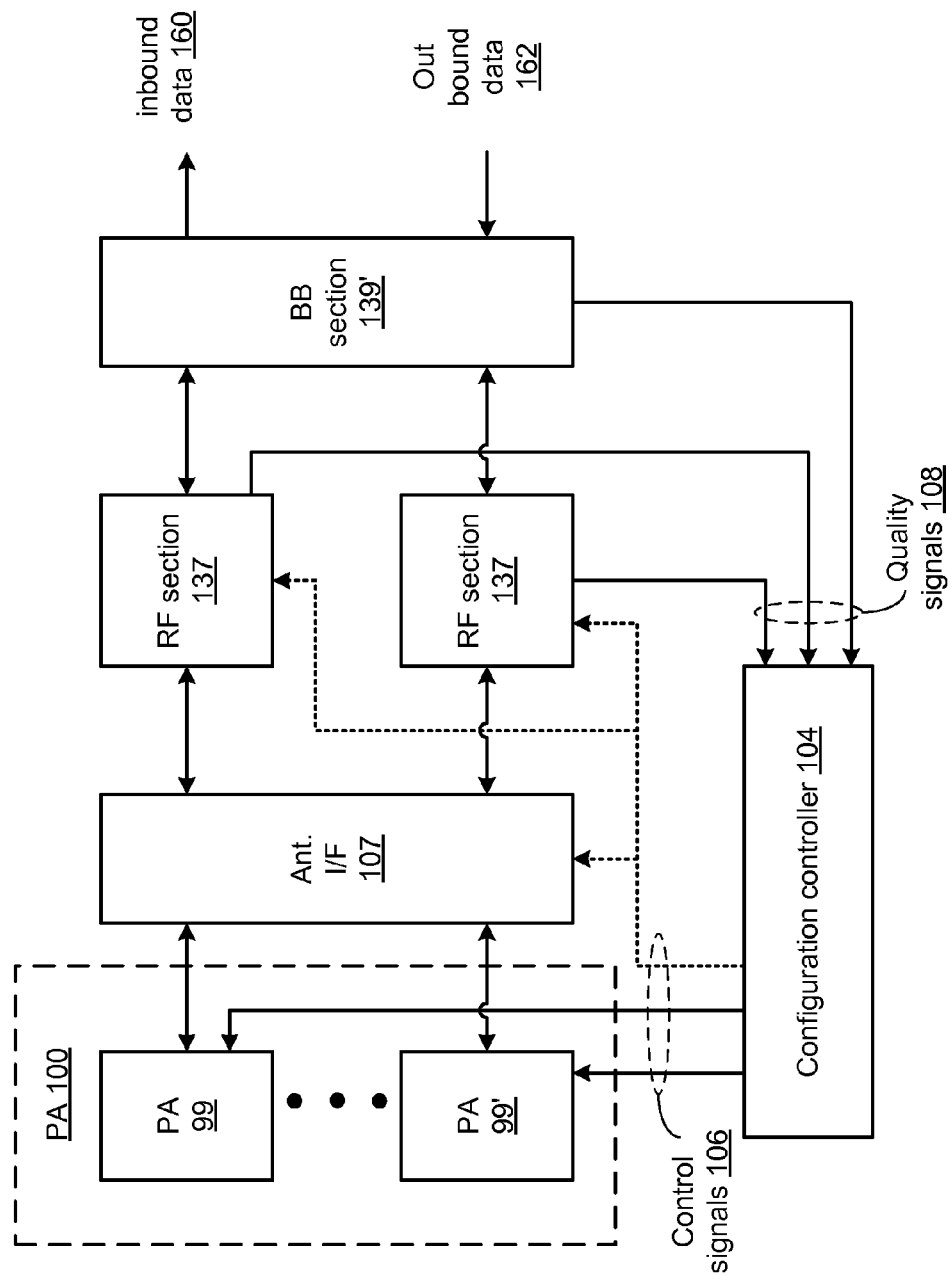
FIG. 17 is a schematic block diagram of an embodiment of a wireless transceiver in accordance with the present invention.

FIG. 17 is a schematic block diagram of an embodiment of a wireless transceiver in accordance with the present invention. In particular, another embodiment of a wireless transceiver, such as wireless transceiver 125 is presented where programmable antenna 100 includes two or more separate phase array antennas 99 and 99'. In an embodiment of the present invention, the phased array antennas 99 and 99' are configured to be spatially diverse from one another, such as be spaced apart, located on different sides or surfaces of a host device 101, etc. The RF transceiver section includes a plurality of RF sections 137 and a common baseband section 139' that processes inbound data 160 and outbound data 162 for communication with via phased array antenna 99, or 99' . . . .

In multi-mode operation, the wireless transceiver 125 can optionally implement individual antenna configurations for different communication modes via different arrays. In single mode operation, antenna configurations from each of the arrays can be evaluated to find an acceptable antenna configuration.

Figure 18:
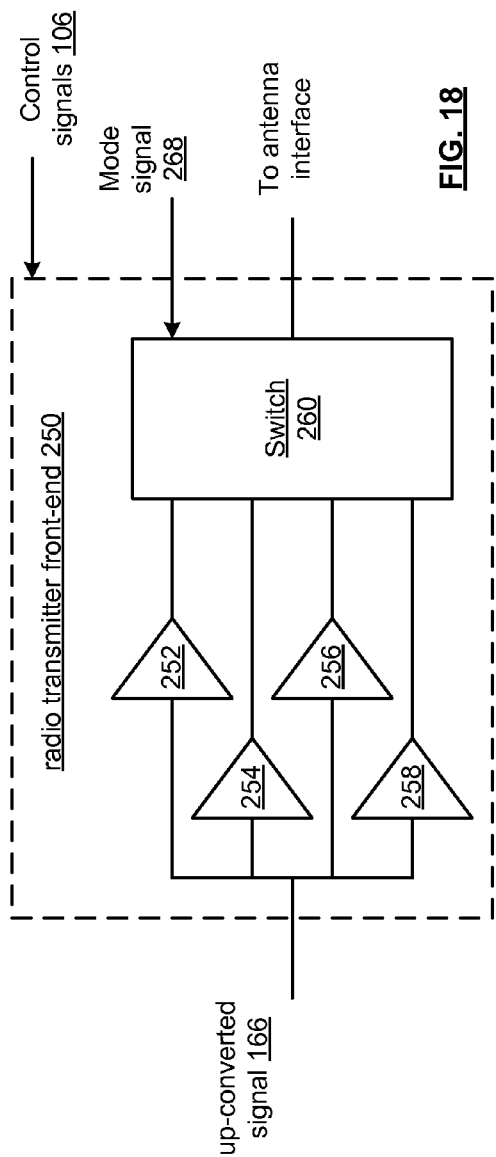
FIG. 18 is a schematic block diagram of an embodiment of a radio transmitter front-end 250 in accordance with the present invention.

FIG. 18 is a schematic block diagram of an embodiment of a radio transmitter front-end 250 in accordance with the present invention. In particular, a radio transmitter front-end 250, such as radio transmitter front-end 150, includes a plurality of power amplifiers 252, 254, 256 and 258 that are selectable via switch 260 based on a mode control signal 268 generated by a communication application of a host device, such as wireless device 101. In particular, power amplifiers 252, 254, 256, and 258 are individually coupleable to the antenna interface via switch 260 based on a power mode, a communication mode and/or linear/non-linear mode indicated by the mode signal 268. In addition, one or more of the power amplifiers 252, 254, 256 or 258 has an output section that is tunable based on the control signals 106 to the particular antenna configuration in use.

Figure 19:
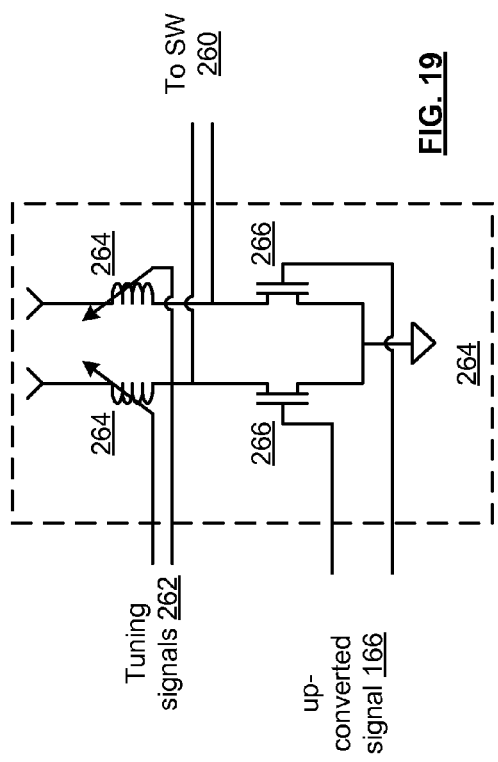
FIG. 19 is a schematic block diagram of an embodiment of a power amplifier in accordance with the present invention.

FIG. 19 is a schematic block diagram of an embodiment of a power amplifier in accordance with the present invention. In particular, a power amplifier 264, such as power amplifier 252, 254, 256 or 258 is shown. An output section is shown, however one or more preamplifiers or other components, not shown, can likewise be included. In operation, transistors 266 generate a power amplified output based on up-converted signal 166. Tunable inductors 264 response to tuning signals 262 to impedance match the output section to an antenna interface coupled via switch 260, such as antenna interface 107. In particular, tunable inductors 264 can be multi-tap inductors with a switch matrix that controls the inductance based on which taps are selected. Further, a plurality of individual inductors can be connected via a switch matrix to couple a selected combination of inductors in series or in parallel to control the overall inductance. In an embodiment of the present invention, the tunable inductors 264 are implemented on a printed circuit board or integrated circuit with one or more layers. Other variable inductor designs can similarly be employed.

Figure 20:
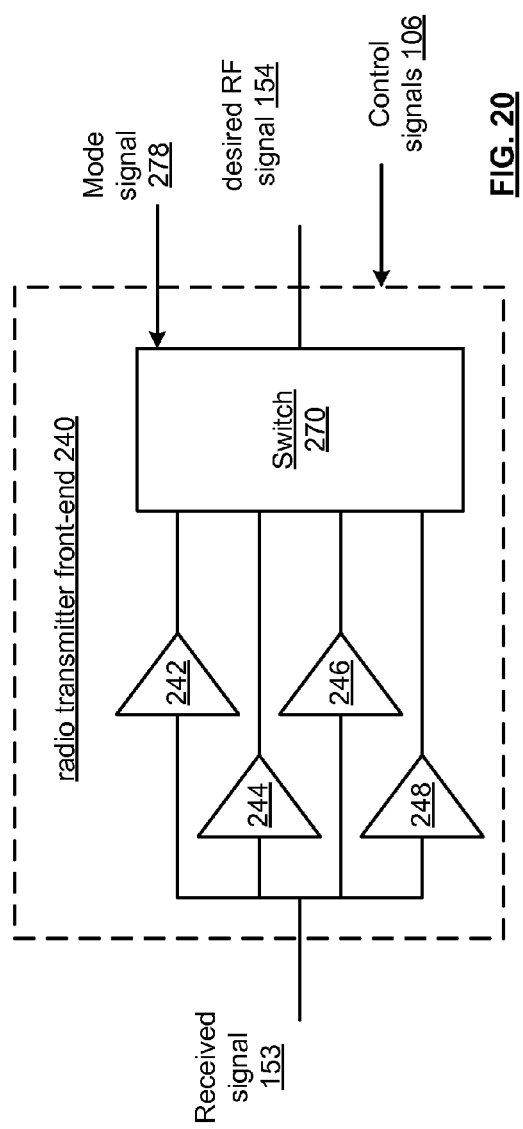
FIG. 20 is a schematic block diagram of an embodiment of an RF front-end 240 in accordance with the present invention.

FIG. 20 is a schematic block diagram of an embodiment of an RF front-end 240 in accordance with the present invention. In particular, RF front-end 240, such as RF front-end 140, includes a plurality of low-noise amplifiers 242, 244, 246 and 248 that are selectable via switch 270 based on a mode control signal 278 generated by a communication application of a host device, such as wireless device 101. In particular, low-noise amplifiers 242, 244, 246 and 248 are individually coupleable to the down-conversion module, such as down-conversion module 142 via switch 270 based on a receiver sensitivity, a communication mode and/or power mode indicated by the mode signal 268. In addition, one or more of the low-noise amplifiers 242, 244, 246 and 248 has an output section that is tunable based on the control signals 106 to the particular antenna configuration in use.

Figure 21:
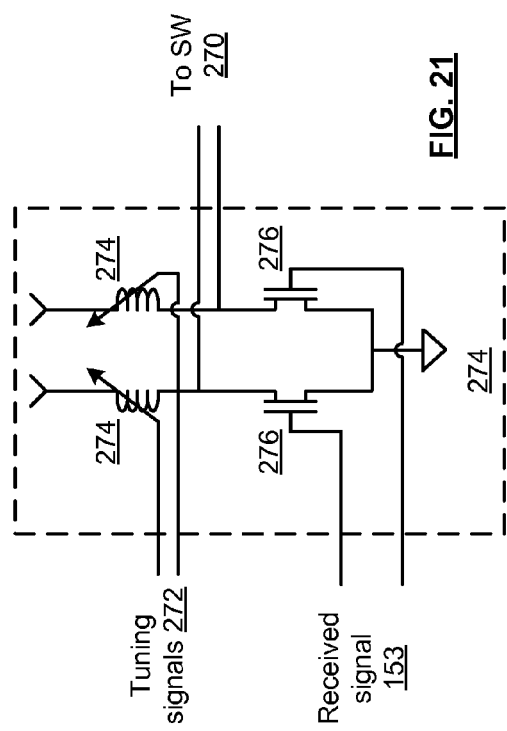
FIG. 21 is a schematic block diagram of an embodiment of a low noise amplifier in accordance with the present invention.

FIG. 21 is a schematic block diagram of an embodiment of a low noise amplifier in accordance with the present invention. In particular, a low noise amplifier 274, such as low-noise amplifiers 242, 244, 246 or 248 is shown. An input section is shown, however one or more other amplifiers, automatic gain control stages, filters or other components, not shown, can likewise be included. In operation, transistors 276 generate an amplified output based on received up-converted signal 153. Tunable inductors 274 respond to tuning signals 272 to impedance match the antenna interface 107. Tunable inductors 274 can be multi-tap inductors with a switch matrix that controls the inductance based on which taps are selected. Further, a plurality of individual inductors can be connected via a switch matrix to couple a selected combination of inductors in series or in parallel to control the overall inductance. In an embodiment of the present invention, the tunable inductors 274 are implemented on a printed circuit board or integrated circuit with one or more layers. Other variable inductor designs can similarly be employed.

Figure 22:
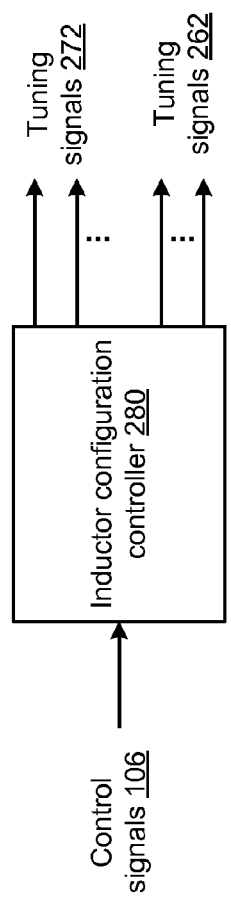
FIG. 22 is a schematic block diagram of an embodiment of inductor configuration controller 280 in accordance with the present invention.

FIG. 22 is a schematic block diagram of an embodiment of inductor configuration controller 280 in accordance with the present invention. In particular, an inductor configuration controller 280 is shown for use in conjunction with RF front-end 240 and radio transmitter front-end 250. Inductor configuration controller 280 generates tuning signals 272 and 262 to one or more of the power amplifiers 252, 254, 256 and 258 and one or more of the low noise amplifiers 242, 244, 246 and 248 to configure the tunable inductors to one of a plurality of tuning configurations, based on the current antenna configuration and the configuration of the antenna interface so as to provide impedance matching for both transmission and reception.

The inductor configuration controller 280 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the inductor configuration controller 280 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

While inductor configuration controller 280 is shown separately from configuration controller 104, the inductor configuration controller 280 can be implemented in a similar fashion to generate the tuning signals in response to the particular antenna configuration in use. Further, the functionality of the two devices can be combined into a single device.

Figure 23:
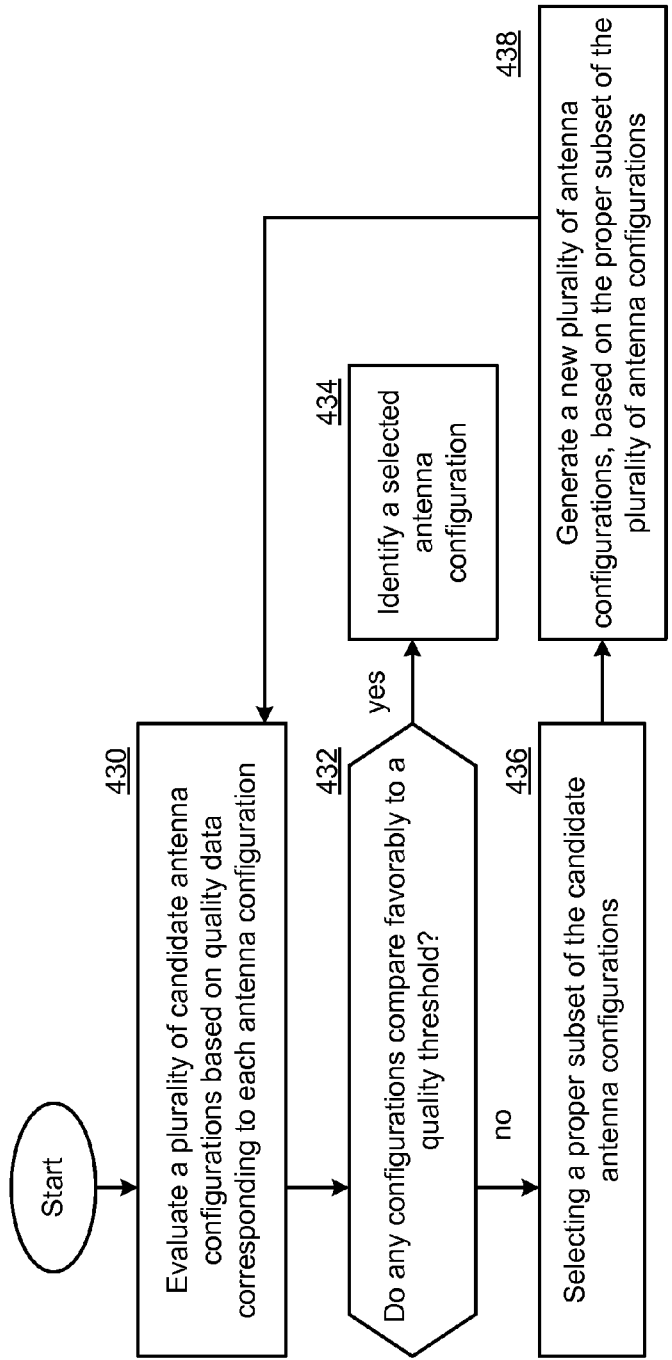
FIG. 23 is a flowchart representation of an embodiment of a method in accordance with the present invention.

FIG. 23 is a flowchart representation of an embodiment of a method in accordance with the present invention. A method is presented for use in conjunction with one or more of the functions and features presented in conjunction with FIGS. 1-22. In particular, a method of generating a control signal is presented for use to configure a programmable antenna via a configuration procedure. In step 430, a plurality of candidate antenna configurations are evaluated based on quality data corresponding to each antenna configuration. In decision block 432, the method determines if any of the candidate antenna configurations have quality data that compare favorably to a quality threshold. If so, the method proceeds to step 434 where a selected antenna configuration is identified. If not, the method proceeds to step 436 select a proper subset of the candidate antenna configurations. In step 438, a new plurality of candidate antenna configurations are generated based on the proper subset of the plurality of candidate antenna configurations. The method proceeds iteratively back to step 430 to evaluate the new plurality of candidate antenna configurations.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention has been described in conjunction with various illustrative embodiments that include many optional functions and features. It will be apparent to those skilled in the art that the disclosed invention may be modified in numerous ways, the functions and features of these embodiments can be combined in other embodiments not expressly shown, and may assume many embodiments other than the preferred forms specifically set out and described above. Accordingly, it is intended by the appended claims to cover all modifications of the invention which fall within the true spirit and scope of the invention.

What is claimed is:

1. A wireless transceiver comprising:
a programmable antenna, that transmits an outbound radio frequency (RF) signal containing outbound data to a remote RF transceiver and that receives an inbound RF signal containing inbound data from the remote RF transceiver, wherein the programmable antenna is configurable to a selected one of a plurality of antenna configurations, based on a control signal;
an antenna interface coupled to the programmable antenna;
at least one RF transceiver section, coupled to the antenna interface, that generates the outbound RF signal based on the outbound data and that generates the inbound data based on the inbound RF signal, the at least one RF transceiver section including at least one power amplifier having an output section that includes a first plurality of tunable inductors that impedance match the output section to the antenna interface;
wherein the at least one RF transceiver section further includes a plurality of low noise amplifiers including at least one low noise amplifier having an input section that includes a second plurality of tunable inductors that impedance match the input section to the antenna interface, and wherein the at least one RF transceiver section further includes a switching matrix that selectively couples one of the plurality of low noise amplifiers to the antenna interface, in response to a mode signal.

2. The wireless transceiver of claim 1 further comprising:
an antenna configuration controller, coupled to the programmable antenna, that generates the control signal to configure the programmable antenna to the selected one of a plurality of antenna configurations;

wherein the first plurality of tunable inductors are controlled to one of a plurality of tuning configurations based on the control signal.

3. The wireless transceiver of claim 1 wherein the antenna interface is programmable to one of a plurality of antenna interface configurations based on the control signal.

4. The wireless transceiver of claim 1 wherein the at least one power amplifier includes a plurality of power amplifiers and the at least one RF transceiver section further includes:

a switching matrix that selectively couples one of the plurality of power amplifiers to the antenna interface, in response to a mode signal.

5. The wireless transceiver of claim 1 further comprising:

an inductor configuration controller, coupled to the at least one RF section, that generates a tuning signal to configure the first plurality of tunable inductors to one of a plurality of tuning configurations.

6. A wireless transceiver comprising:

a programmable antenna, that transmits an outbound radio frequency (RF) signal containing outbound data to a remote RF transceiver and that receives an inbound RF signal containing inbound data from the remote RF transceiver, wherein the programmable antenna is configurable to a selected one of a plurality of antenna configurations, based on a control signal;

an antenna interface coupled to the programmable antenna;

at least one RF transceiver section, coupled to the antenna interface, that generates the outbound RF signal based on the outbound data and that generates the inbound data based on the inbound RF signal, the at least one RF transceiver section including at least one low noise amplifier having an input section that includes a first plurality of tunable inductors that impedance match the input section to the antenna interface; wherein the at least one low noise amplifier includes a plurality of low noise amplifiers and the at least one RF transceiver section further includes a switching matrix that selectively couples one of the plurality of low noise amplifiers to the antenna interface, in response to a mode signal.

7. The wireless transceiver of claim 6 further comprising:

an antenna configuration controller, coupled to the programmable antenna, that generates the control signal to configure the programmable antenna to the selected one of a plurality of antenna configurations;

wherein the first plurality of tunable inductors are controlled to one of a plurality of tuning configurations based on the control signal.

8. The wireless transceiver of claim 6 wherein the antenna interface is programmable to one of a plurality of antenna interface configurations based on the control signal.

9. The wireless transceiver of claim 6 further comprising:

an inductor configuration controller, coupled to the at least one RF section, that generates a tuning signal to configure the plurality of tunable inductors to one of a plurality of tuning configurations.

10. The wireless transceiver of claim 6 wherein the at least one RF transceiver section further includes a plurality of power amplifiers each having an output section that includes a second plurality of tunable inductors that impedance match the output section to the antenna interface and the at least one RF transceiver section further includes:

a switching matrix that selectively couples one of the plurality of low noise amplifiers to the antenna interface, in response to a mode signal.

11. A radio frequency (RF) transceiver section that generates an outbound RF signal based on the outbound data and that generates the inbound data based on an inbound RF signal, the RF transceiver section comprising:

at least one power amplifier having a output section that includes a first plurality of tunable inductors that impedance match the output section to an antenna interface, in response to a tuning signal;

a plurality of low noise amplifiers including at least one low noise amplifier having an input section that includes a second plurality of tunable inductors that impedance match the input section to the antenna interface; and a switching matrix that selectively couples one of the plurality of low noise amplifiers to the antenna interface, in response to a mode signal.

12. The RF transceiver section of claim 11 wherein the first plurality of tunable inductors are controlled to one of a plurality of tuning configurations based on the tuning signal; and wherein the tuning signal is generated by an antenna configuration controller, coupled to the programmable antenna, that also generates the tuning signal to configure the programmable antenna to the selected one of a plurality of antenna configurations.

13. The RF transceiver section of claim 11 wherein the at least one power amplifier includes a plurality of power amplifiers and the RF transceiver section further includes:

a switching matrix that selectively couples one of the plurality of power amplifiers to the antenna interface, in response to a mode signal.

14. The RF transceiver section of claim 11 further comprising:

an inductor configuration controller, coupled to the at least one RF section, that generates the tuning signal.

\* \* \* \* \*